UNITED STATES PATENT OFFICE.

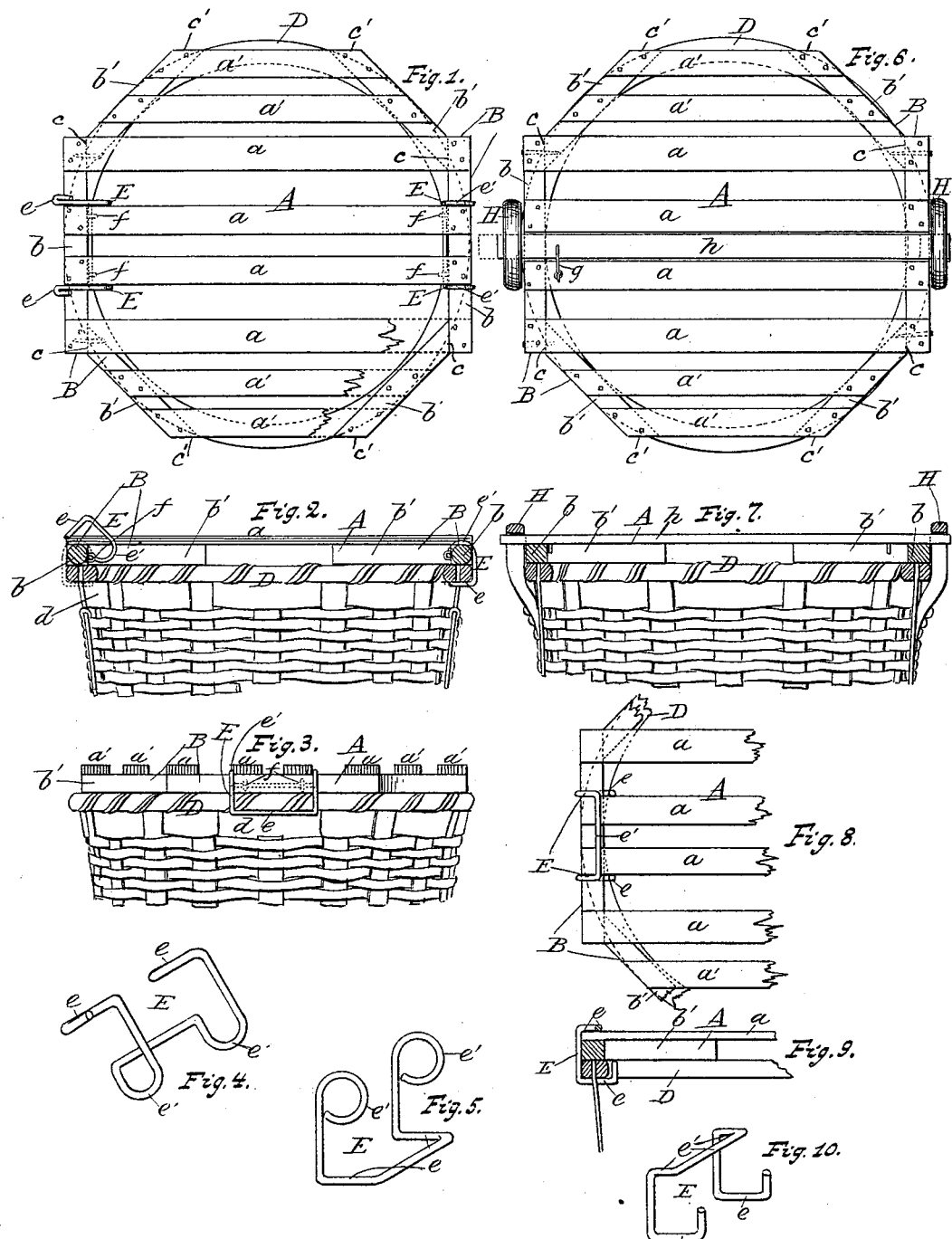

GEORGE C. GARBRANCE, OF WATERVLIET, NEW YORK.

BASKET-COVER.

SPECIFICATION forming part of Letters Patent No. 403,528, dated May 21, 1889.

Application filed January 10, 1889. Serial No. 295,937. (No model.)

*To all whom it may concern:*

Be it known that I, GEORGE C. GARBRANCE, a citizen of the United States, residing in the town of Watervliet, in the county of Albany and State of New York, have invented certain new and useful Improvements in Covers for Vegetable and Fruit Baskets, of which the following is a specification.

My invention relates to covers for vegetable and fruit baskets; and it consists in the combinations of devices and parts hereinafter particularly described, and specifically set forth in the claims.

The objects of my invention are, first, to combine with the series of horizontal slats or bars, set at intervals apart and extending over an area corresponding with the area of the upper open end of the basket with which the cover is to be used, two oppositely-located angular rim-bearing devices, with which the said slats are secured, and which have bearing on the opposite sides of the rim of the basket, where the handles of the same occur, whereby the slats will be supported from the upper side of the angular rim-bearing pieces and a distance from the upper side rim of the basket, while the angular rim-bearing pieces will be supported in all their lengths on the upper side of the rim of the basket and on at least two-thirds of each half portion of the said rim, and thereby render the basket-cover stronger for supporting several baskets which may be piled thereon; and, further, to provide a simple and cheaply-constructed fastening device which can be repeatedly employed with the same cover to secure it to the basket, and can, at will, be made to engage with the rim of the basket or be disengaged from the same. I attain these objects by the means illustrated in the accompanying drawings, forming a part of this specification, in which—

Figure 1 is a plan view of a cover embodying the improvements in this invention and illustrating the same in position for covering the upper end of the basket. Fig. 2 is a sectional view of the same. Fig. 3 is a view showing an end of the cover and the side of the basket, with the fastening device holding the former with the basket. Fig. 4 is a perspective view of a fastening device shown in Figs. 1, 2, and 3. Fig. 5 is a sectional view illustrating a modification of the fastening device which can be employed with the cover and the basket. Fig. 6 is a plan view of the cover and illustrating its use with the basket having upwardly-projecting handles and means for holding the cover in place. Fig. 7 is a sectional elevation of the same. Fig. 8 is a plan view illustrating another modification of fastening device which can be employed with the basket and cover. Fig. 9 is a sectional view of the same. Fig. 10 is a perspective view of this modification shown in Figs. 8 and 9.

The same letters of reference refer to like parts throughout the several views.

In the drawings, A represents the cover of a fruit or vegetable basket, which is composed of the angular-form rim-bearing pieces B B, constructed with substantially the same form of the bars $b$ $b'$ $b'$ and the slats $a$ $a'$. The bars $b$ $b'$ $b'$ are each preferably made of pieces of wood about one inch square, with the bar $b$ preferably made with a length about equal to a little more than one-eighth of the full circle of the rim of the basket, and the bars $b'$ $b'$ are made on their longer side preferably about the length of about one-eighth of the circle of the said rim, and have their ends cut with the bevels $c$ and $c'$, as shown, with one of the beveled ends, as $c$, secured, preferably, by nails to an end portion of bar $b$, as shown in Fig. 1. When these bars $b'$ $b'$ are secured to the bar $b$, they form the rim-bearing piece B, which will be substantially in the form of three sides of an octagonal, as shown in Figs. 1 and 6, and these bearing-pieces thus produced will be in condition to have full bearing in all the lengths of their respective parts $b$ $b'$ $b'$ on the upper surface of the rim of the basket with which the cover is to be used. Two of these rim-bearing pieces B, formed as above described, are set apart from each other to a distance which will bring the respective bars $b$ of said devices to the outer circumference of the rim of the basket, as illustrated in Figs. 1 and 6, so that they can be received between the handles H, projecting upwardly from the rim of the basket, as shown in Figs. 6 and 7, or over the handle-holes made below the rim-piece D of the basket, as is sometimes employed in baskets when projecting handles are not used.

The slats $a$ and $a'$ are preferably made about one and one-half inch wide, and about three-eighths of an inch in thickness, and are set apart to a distance of about one inch, (more or less, as the size of the vegetables and fruits to be protected may require,) so as to prevent their removal from the basket through the opening between the slats. The slats $a\ a$ are made to extend from the outside of bar $b$ of one side rim-bearing device B to the outside of the bar $b$ of the opposite rim side bearing piece, and with those two bars $b\ b$ the several slats $a\ a$ form a rectangular portion of the cover, while the slats $a'\ a'$, secured to the pieces $b'\ b'$ of the respective rim-bearing piece B, supplement the rectangular portion of the cover formed by the bars $b\ b$ and the slats $a\ a$ and cover over the portions of the upper end opening of the basket which are outward past the portion covered by slats $a\ a$, secured with the bars $b$.

By arranging the pieces $b'\ b'$ at an angle to bar $b$ in each rim-bearing device B the slats $a'\ a'$ are made shorter between their secured ends and bearing on pieces $b'\ b'$ than they would be were the parts $b'\ b'$ omitted and the bar $b$ extended to the full width of the cover, so as to receive on it the slats of like length as slats $a\ a$, as in a square form of cover. By this form of construction and arrangement of the parts $b'\ b'$ to an angular form of arrangement in the pieces B, and the attachment of the slats $a'\ a'$ to the angularly-arranged parts $b'\ b'$ of said rim-bearing piece, as shown, the cover is made to be stronger and capable of sustaining greater weight than would slats of the same thickness and width in covers which are made with the square form as heretofore, and the slats $a'\ a'$ will be more stiff to support, without breaking, the weight of several baskets placed on the same than will slats in square-form covers of width equal to the diameter of the rim of the basket. Another advantage had is that by this improved form of construction of the cover covers for baskets of large diameter of upper open end having light slats will be strong to support a tier of from four to six baskets piled up on the cover without the slats being broken, as the short slats $a'\ a'$ supplement the strength of the longer slats, $a\ a$.

Market-men and fruit growers and dealers employ two kinds of baskets for holding and transporting vegetables and fruits—one kind having a handle-hole, $d$, below the rim D of the basket, and baskets employing an upwardly-projecting handle having a hand-hole, $d$, projected upwardly above the plane of the rim D, as shown in Figs. 6 and 7. When upwardly-projected handles are employed, they are generally made to set outside the circumference of the rim D of the upper edge of the basket, and in either case the cover A, above described, is to be made to correspond in its cross-direction with the diameter of the rim D of the basket, so that where a hand-hole, $d$, is made below the rim portion D of the basket, as shown in Figs. 1, 2, and 3, the cover will set upon the portion of the rim D, operating as a handle, or between handles H H, where projected handles are used, as shown in Figs. 6 and 7.

E is a fastening device by which the cover will be securely held with the basket by binding the bars $b$ of the former down on the portion of the rim D of the latter at the handle-opening or other opening of the same. This fastening device is made of heavy wire and of any suitable form for operating with the rim D of the basket and bar $b$ of the rim-bearing device B, and can be made with the form shown in Figs. 1, 2, 3, and 4, and be permanently connected with bar $b$ by means of a staple, $f$, so as to be capable of being turned from position shown by full lines, left-hand side of Figs. 1 and 2, to that of full lines shown in left-hand side of the same figures, so that the hooked portion $e$ of the fastening device E will engage with the lower side of the rim D of the basket at the hand-hole $d$ and hold with the same when it is desired to secure the cover in place on the basket. When the cover is to be removed, one of these fastening-pieces E, or both, can be turned out of an engaging position with the rim D, as shown in Fig. 2, when the cover can be readily removed. These fastening-pieces E can be made substantially as shown in Fig. 5 by turning the wire around on bars $b$ to form eyes $e'$, for holding with said bar, and allowing the piece to be turned to an engaging situation with the rim of the basket or out from the said engagement, as may be required; or the piece E can be made in the form shown in Figs. 8, 9, and 10, when the engaging portions $e\ e$ will be adapted to engage with the lower side of the rim D of the basket and portion $e'$ with the upper side of the cover, as shown in Figs. 8 and 9. In this latter case the fastening device E will be detachable in character from the cover; but when made as illustrated in Figs. 2, 4, and 5 the fastening-piece will be held attached with the cover, and in either case the holding-limbs $e$ of piece E will engage with the rim D of the basket, while the portion $e'$ will operate with the bar $b$, or slats on the same, to hold the cover fastened down on the former and secure it to the basket. This fastening device can be readily produced from wire by suitable tools and be made to have permanent attachment with the cover, as shown in Figs. 1, 2, and 5, or be detachable from both the cover and the basket, as illustrated in Figs. 9 and 10, without departing from the general feature of changeable situation in reference to both the cover and rim of the basket.

In Figs. 6 and 7 the handles H H are shown to have used with them and the cover the endwise-moving fastening-bar $h$, situated between the two middle slats, $a\ a$, of the cover and resting on the bars $b\ b$, and passing through the hole in handles H H and engaging with the lower sides of the holding-pieces of the same. By an endwise movement of the bar $h$ in one direction (after the cover has been placed in position on the rim D) one end of said bar $h$ will be made to enter into the hand-hole of one handle, when, by reversed endwise movement, this bar will be made to have its opposite end enter into the other handle and hold with the same, when, by hooking key $g$, this bar will be kept from shifting. This form of fastening (shown in Figs. 6 and 7) will operate to hold the above-described cover in place on rim D and between handles H H.

Having described my invention, what I claim is—

1. In covers for fruit or vegetable baskets, the combination, with the oppositely-located angular rim-bearing pieces B B, constructed of pieces, as above described, of the long slats $a$ $a$, secured by their ends to bars $b$ $b$ of the said rim-bearing pieces, and the outer and shorter slats, $a'$ $a'$, secured by their ends to bars $b'$ $b'$, all substantially as described, for the purposes set forth.

2. The combination, with the cover A, composed of the two oppositely-located rim-bearing pieces B B, constructed of parts $b$ $b'$ $b'$ and slats $a$ $a'$, as described, of the fastening-pieces E, having holding-limbs $e$, for engagement with the lower side of rim-piece of the basket, and portion $e'$, for engagement with the cover at its upper side, substantially as and for the purposes set forth.

GEORGE C. GARBRANCE.

Witnesses:
WILLIAM F. SELKIRK,
CHARLES SELKIRK.